US010640045B2

(12) United States Patent
Filipiak et al.

(10) Patent No.: US 10,640,045 B2
(45) Date of Patent: May 5, 2020

(54) LOW PROFILE MIRROR PIVOT

(71) Applicant: Gentex Corporation, Zeeland, MI (US)

(72) Inventors: Kenneth R. Filipiak, West Olive, MI (US); Christopher J. Koleszar, Zeeland, MI (US); Ulrich A. Kuester, Spring Lake, MI (US); Mark R. Roth, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/698,749

(22) Filed: Sep. 8, 2017

(65) Prior Publication Data

US 2018/0065555 A1 Mar. 8, 2018

Related U.S. Application Data

(60) Provisional application No. 62/385,023, filed on Sep. 8, 2016.

(51) Int. Cl.
*B60R 1/00* (2006.01)
*B60R 1/04* (2006.01)
*G02B 7/182* (2006.01)

(52) U.S. Cl.
CPC ............. *B60R 1/04* (2013.01); *G02B 7/1821* (2013.01)

(58) Field of Classification Search
CPC .................. B60R 1/04; G02B 7/1821
USPC ........................................ 359/876
See application file for complete search history.

(56) References Cited

U.S. PATENT DOCUMENTS

| 4,668,059 | A  | * | 5/1987  | Ohyama ............... B60R 1/04 248/467 |
| 6,299,319 | B1 | * | 10/2001 | Mertens ............... B60R 1/04 359/871 |
| 6,501,387 | B2 | * | 12/2002 | Skiver ................. B60R 1/12 340/815.4 |
| 7,004,593 | B2 |   | 2/2006  | Weller et al. |
| 8,197,077 | B2 |   | 6/2012  | Brouwer |
| 8,646,924 | B2 | * | 2/2014  | Roth .................... B60R 1/04 359/872 |
| 2007/0183068 | A1 | | 8/2007 | Kozlowski |

(Continued)

FOREIGN PATENT DOCUMENTS

| EP | 0975488 B1   | 10/2002 |
| EP | 300659 A1    | 3/2016  |
| WO | 2007046695 A1| 4/2007  |

*Primary Examiner* — Stephone B Allen
*Assistant Examiner* — Rahman Abdur
(74) *Attorney, Agent, or Firm* — Price Heneveld LLP; Bradley D. Johnson

(57) ABSTRACT

A rearview assembly includes a mount configured to be operably coupled with a vehicle. A first support includes a generally linear body and extends downward from the mount. The first support defines a first axis of rotation. A second support defines a second axis of rotation and extends from a side of the first support in a direction generally orthogonal to the axis of rotation of the first support. A brace is coupled with the second support and extends below the second support. A spring clip extends around and is in abutting contact with the second support. A housing is operably coupled with the second support. The housing is rotatable about both the first axis of rotation and the second axis of rotation.

18 Claims, 9 Drawing Sheets

(56) References Cited

U.S. PATENT DOCUMENTS

2009/0219637 A1* 9/2009 Brouwer .................. B60R 1/04
 359/844
2014/0055617 A1* 2/2014 Minikey, Jr. .............. B60R 1/04
 348/148

* cited by examiner

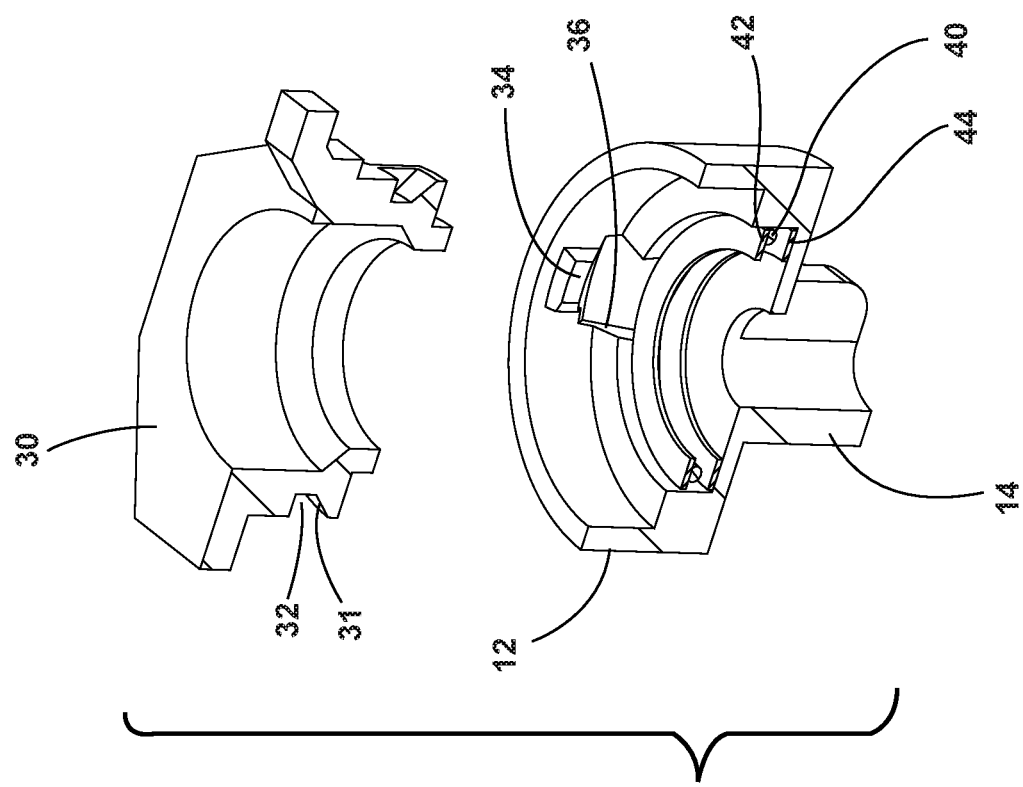

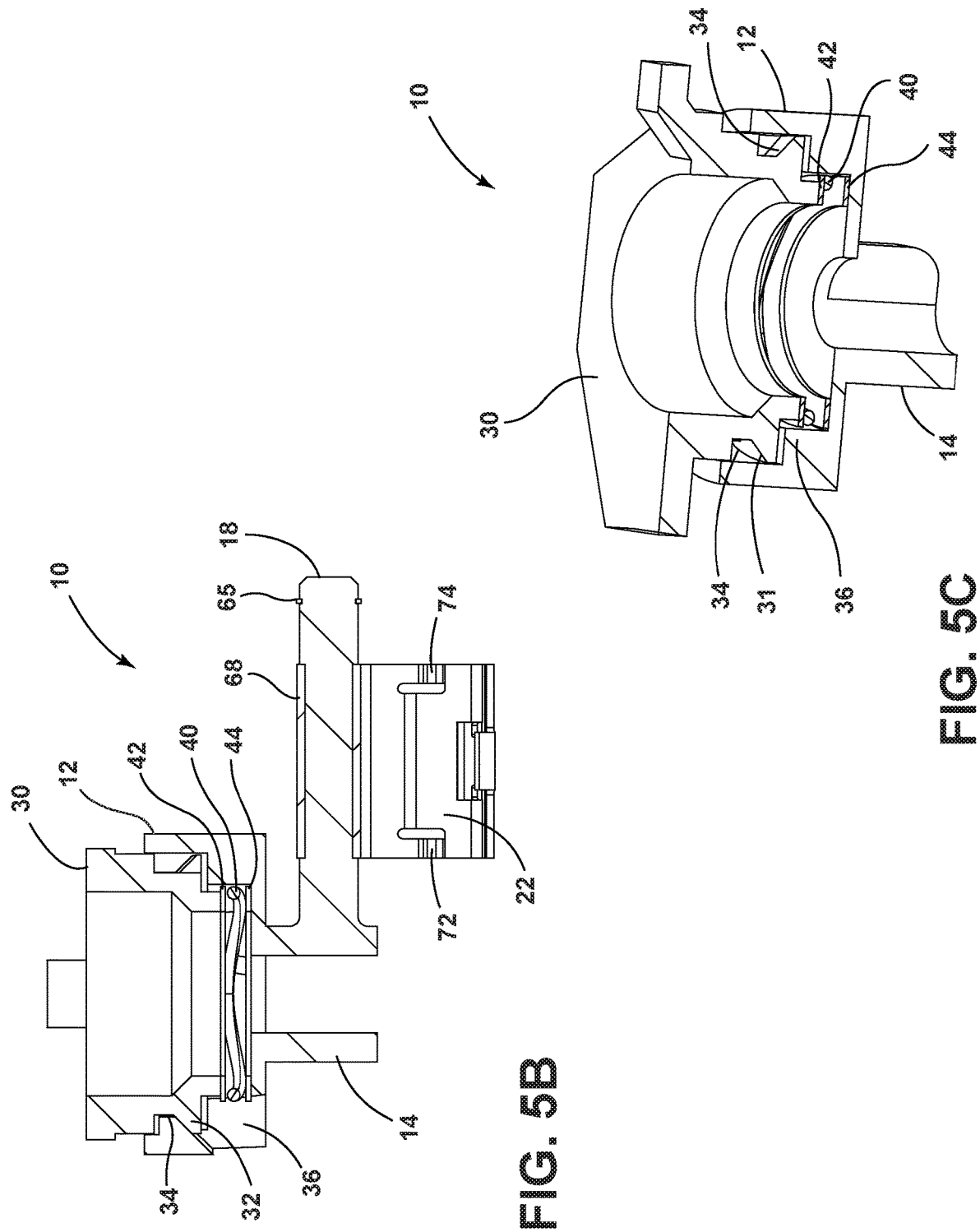

LOW PROFILE MIRROR PIVOT

CROSS-REFERENCE TO RELATED APPLICATION

This application claims priority to and the benefit under 35 U.S.C. § 119(e) of U.S. Provisional Patent Application No. 62/385,023, filed on Sep. 8, 2016, entitled "LOW PROFILE MIRROR PIVOT," the disclosure of which is hereby incorporated herein by reference in its entirety.

FIELD OF THE DISCLOSURE

The present disclosure generally relates to a mirror pivot, and more particularly to a low profile mirror pivot.

SUMMARY OF THE DISCLOSURE

According to one aspect of the present disclosure, a rearview assembly includes a mount configured to be operably coupled with a vehicle. A first support includes a generally linear body and extends downward from the mount. The first support defines a first axis of rotation. A second support defines a second axis of rotation and extends from a side of the first support in a direction generally orthogonal to the axis of rotation of the first support. A brace is coupled with the second support and extends below the second support. A spring clip extends around and is in abutting contact with the second support. A housing is operably coupled with the second support. The housing is rotatable about both the first axis of rotation and the second axis of rotation.

According to another aspect of the present disclosure, a rearview assembly includes a mount configured to be operably coupled with a vehicle. A first support extends downward from the mount and defines a first axis of rotation. A second support defines a second axis of rotation and extends orthogonal from the first support. A brace is coupled with the second support proximate a carrier plate. A spring clip extends around and is in abutting contact with the second support. A housing is operably coupled with the second support and supports a carrier plate operably coupled with an electro-optic device. The housing is rotatable about both the first axis of rotation and the second axis of rotation.

According to yet another aspect of the present disclosure, a rearview assembly includes a mount configured to be operably coupled with a vehicle. A first support extends downward from the mount and defines a first axis of rotation. A second support defines a second axis of rotation and extends orthogonal from the first support. A brace is coupled with the second support proximate a carrier plate operably coupled with an electro-optic device. A spring clip includes an upper clamp portion that provides a clamping force around the second support. The clamping portion and the electro-optic device are rotatable about both the first axis of rotation and the second axis of rotation. A housing is operably coupled with the second support and supports the carrier plate.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4C is a top perspective exploded view of the support member of FIG. 4;

FIG. 5B is a front elevational view of the support member of FIG. 5A;

FIG. 5C is a top perspective view of a portion of the support member of FIG. 5A;

DETAILED DESCRIPTION

Figure 1:
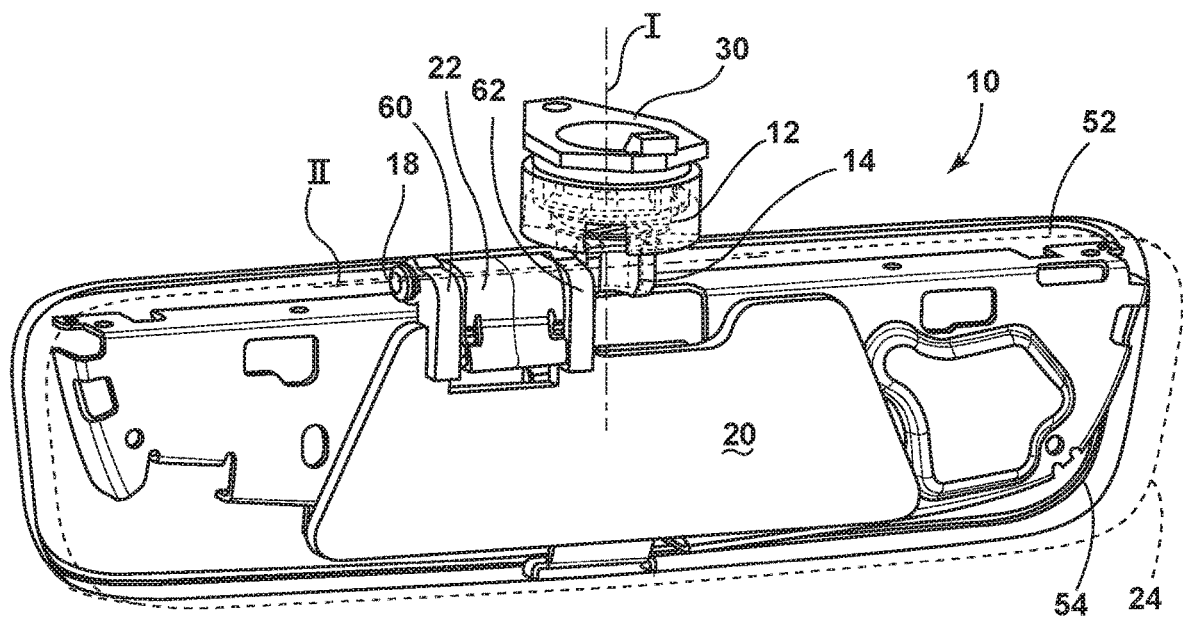
FIG. 1 is a rear perspective view of a rearview assembly of the present disclosure.
Figure 2:
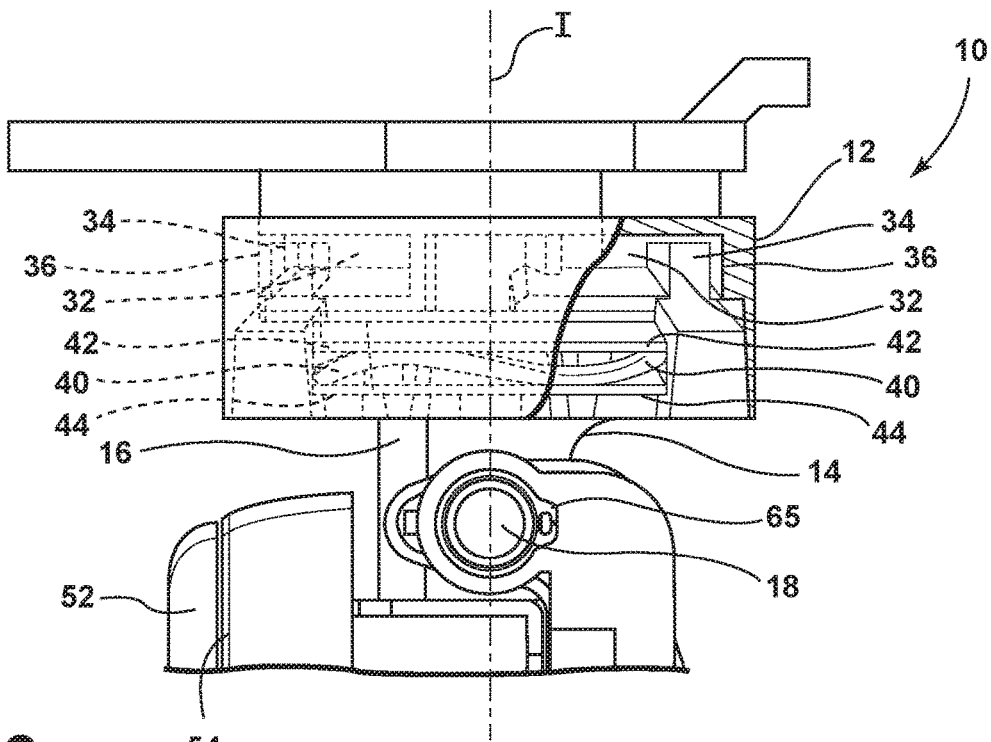
FIG. 2 is a partial side elevational view of one embodiment of a mount and bracket interface for the rearview assembly of FIG. 1.
Figure 3:
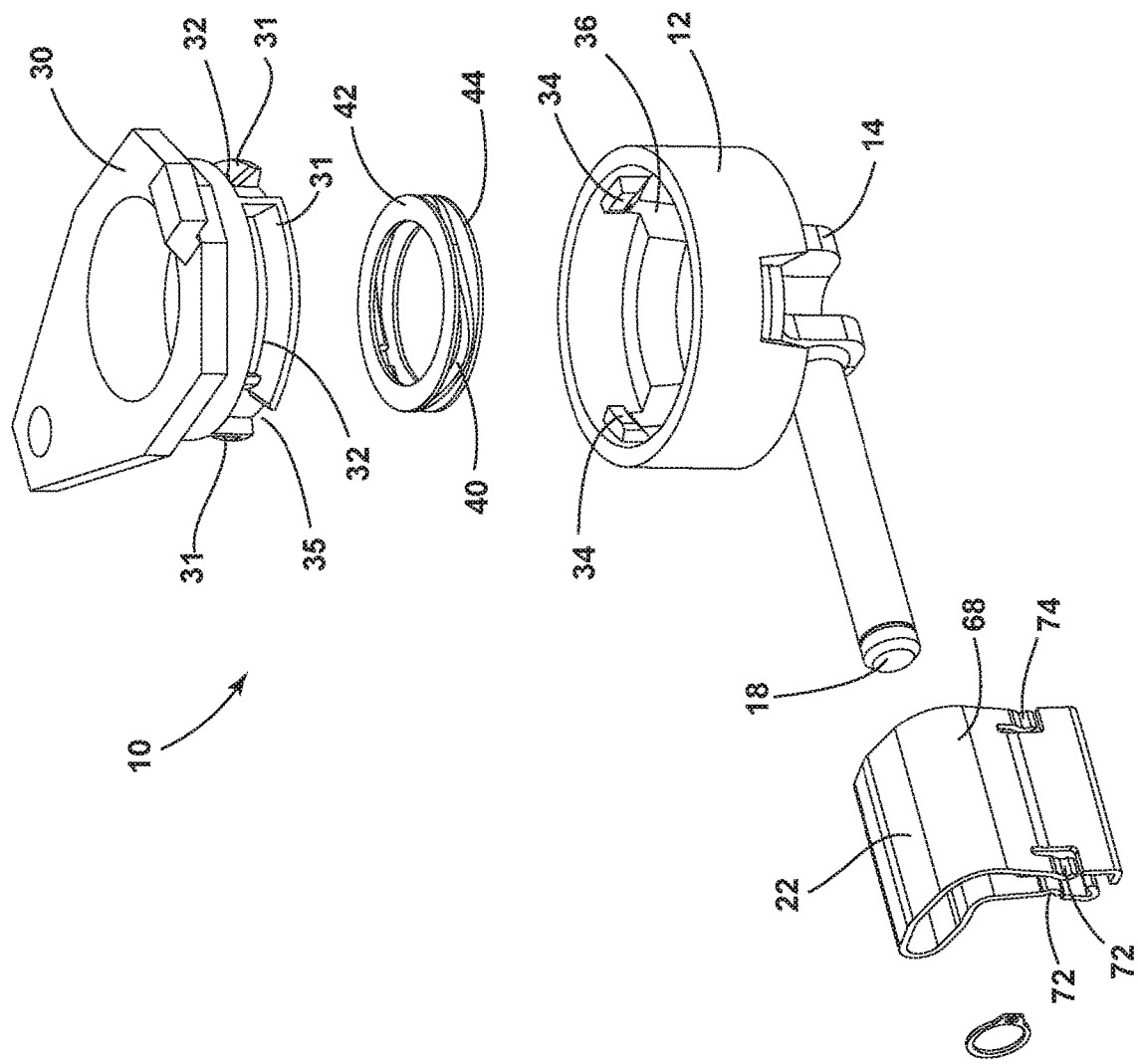
FIG. 3 is an exploded view of the mount and bracket interface of FIG. 2.
Figures 4, 4A:
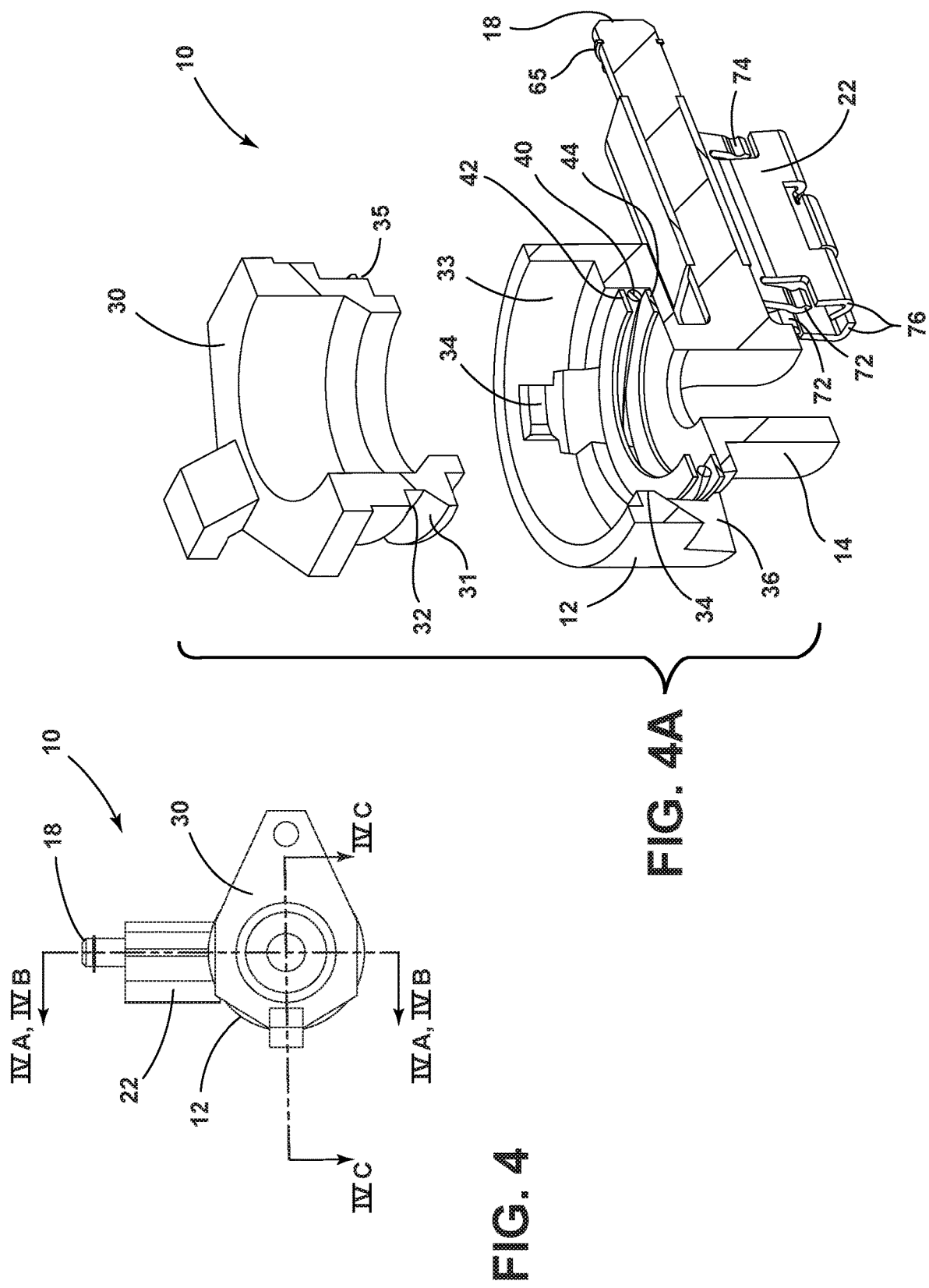
FIG. 4 is a top plan view of one embodiment of a mount and bracket of the present disclosure prior to assembly.
FIG. 4A is a front exploded perspective view of the mount and bracket assembly of FIG. 4 taken at line IVA-IVA with the mount separated from the bracket.
Figure 4B:
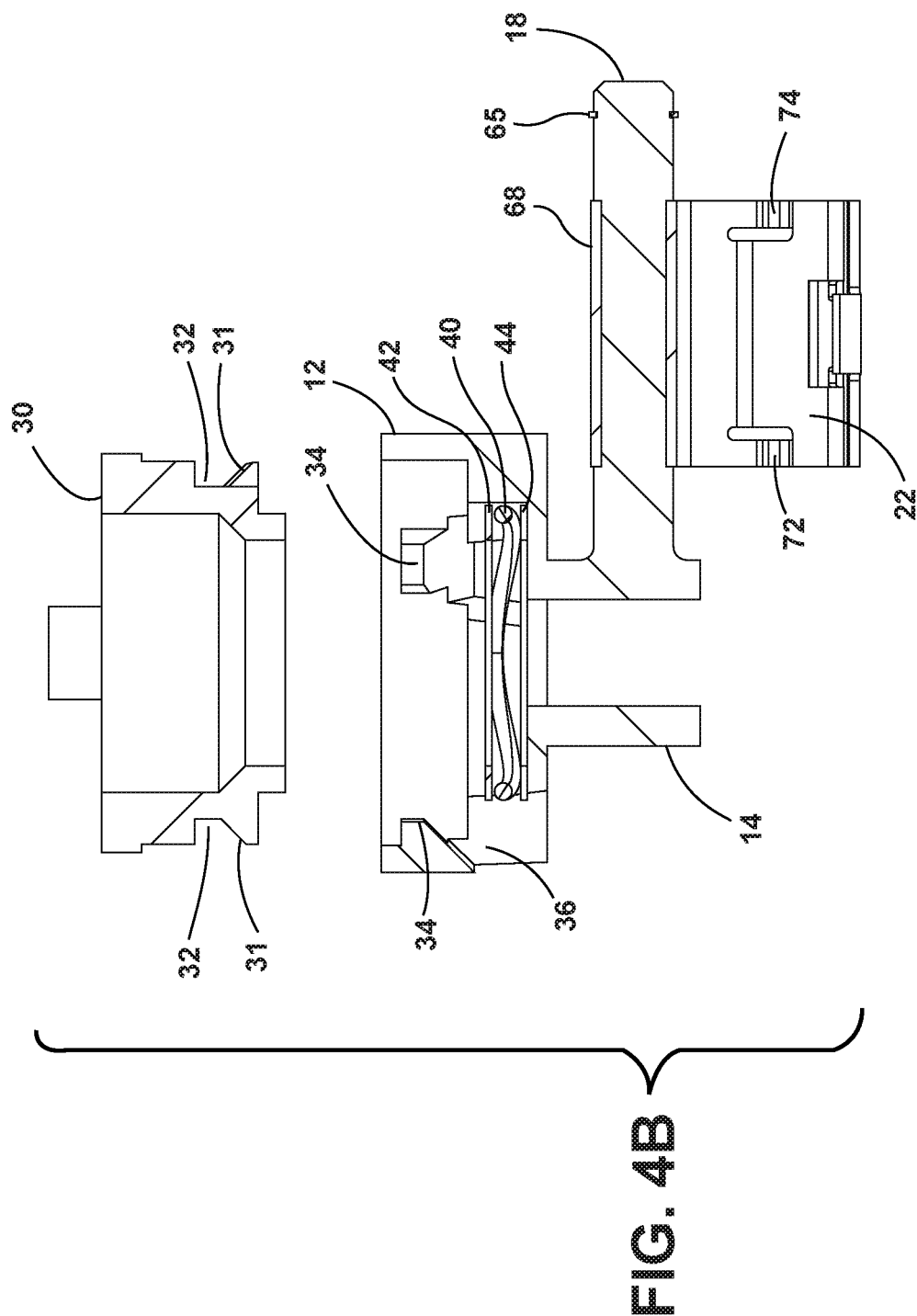
FIG. 4B is a front elevational cross-sectional view of the support member of FIG. 4A.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-8, reference numeral 10 generally designates a rearview assembly that includes a mount 12 configured to be operably coupled with a vehicle. A first support 14 includes a body 16 that extends downward from the mount 12. The first support 14 defines a first axis of rotation (I). A second support 18 defines a second axis of rotation (II) and extends from a side of the first support 14 in a direction generally orthogonal to the first axis of rotation (I) of the first support 14. A brace 20 is coupled with the second support 18 and extends below the second support 18. A spring clip 22 extends around and is in abutting contact with the second support 18. A housing 24 is operably coupled with the second support 18. The housing 24 is rotatable about both the first axis of rotation (I) and the second axis of rotation (II).

With reference again to FIG. 1, the rearview assembly 10 is generally configured for connection with a headliner or a windshield of a vehicle. However, it is contemplated that the rearview assembly 10 may also be directly mounted to a structure or skeleton of a vehicle. This may include direct mounting to sheet metal or frame members of the vehicle. It is also contemplated that the mount 12 may be coupled with a bracket 30 attached to and extending from an interior or exterior portion of a vehicle. The bracket 30 is, in one embodiment, operably coupled with an inside surface of a windshield. The bracket 30 may couple with a mechanical interlock fixedly coupled with an inside surface of the windshield. The bracket 30 interfaces with the mount 12 of the rearview assembly 10. The bracket 30 includes a recessed engagement wall 31 that defines channels 32 that are configured to receive protrusions 34 that extend from the mount 12. The channels 32 may be arcuate extending within an arcuate internal wall 33 of the mount 12 until each of the protrusions 34 aligns with a break 35 in the recessed engagement wall 31. During installation, the mount 12 can be rotated a predetermined degree, thereby rotating the protrusions 34 of the mount 12 into secure engagement with the channels 32 of the bracket 30. The protrusions 34 are rotated in the channel 32 until the protrusions 34 abut a stop 36. Multiple stops 36 may be disposed within the bracket 30, which may be spaced a sufficient distance apart to allow a wide angle of rotation to the first support 14, and consequently the rearview assembly 10. The mount 12 is then moved into a butting engagement with the bracket 30 and rotated. Upon rotation, the protrusions 34 slide within the channels 32 and abut the recessed engagement wall 31, preventing the mount 12 from disengaging the bracket. To remove the rearview assembly 10 from the bracket 30, the rearview assembly 10, and consequently the mount 12, is rotated to non-use position which will also align the protrusions 34 with the breaks 35 in the recessed engagement wall 31 of the bracket 30. The rearview assembly 10 can then be withdrawn from the bracket 30. The mount 12 is then secured with the bracket 30.

With reference again to FIGS. 4-5C, the mount 12 of the rearview assembly 10 is preloaded axially by a wire formed wave spring 40 that extends between upper and lower washers 42, 44 of the mount 12. Accordingly, rotation in a horizontal plane about the first axis of rotation (I) (a generally vertical axis) is frictionally resisted by the wave spring 40 as the rearview assembly 10 is rotated. As a result, the wire formed wave spring 40 generally secures the rearview assembly 10 in a position predetermined by an operator and holds that position once released by the operator. It will be understood that more pressure can be placed on the wave spring 40 by closing the distance between the upper and lower washers 42, 44. This will result in increased force required to rotate the rearview assembly 10 about the first axis of rotation (I).

With reference again to FIG. 1, the rearview assembly 10 includes a carrier plate 50 that supports an electro-optic device 52. One non-limiting example of an electro-optic device 52 is an electro-optic element having an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES"; U.S. Pat. No. 6,519,072 entitled "ELECTROCHROMIC DEVICE"; and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. The glass element may also be any other element having partially reflective, partially transmissive properties.

Figure 5A:
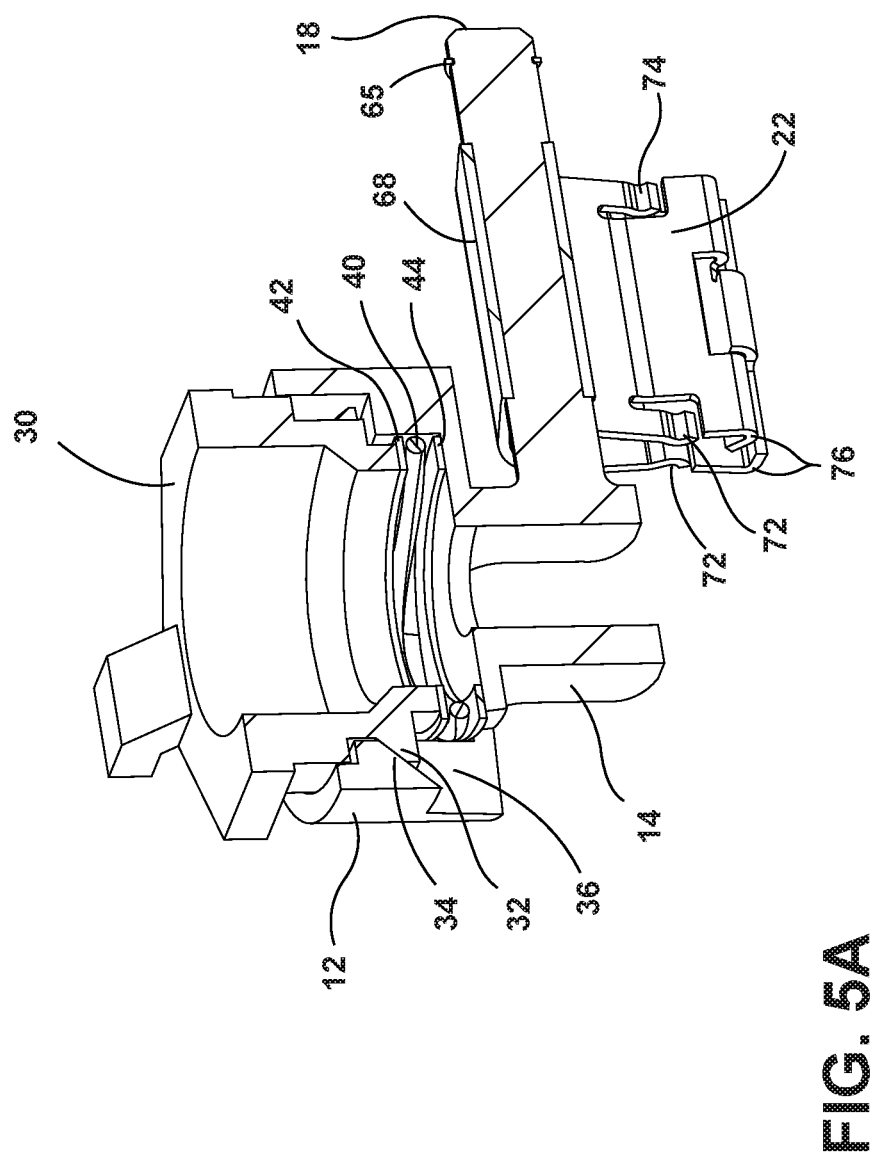
FIG. 5A is a front perspective view of the mount and bracket of FIG. 4A after assembly.

The carrier plate 50 may also support a full display device 54 that displays an image captured from outside the vehicle. For example, the full display device 54 may display an image of a rear portion of a vehicle that is captured by a rear imager or camera of the vehicle. The carrier plate 50 also supports a number of other components and features. In addition, the brace 20 extends behind the carrier plate 50 and may be in abutting contact therewith. The brace 20 is generally integrally coupled with the spring clip 22, which extends around the second support 18. The illustrated support 18 is shown extending from only one side of the mount 12. This configuration provides a lighter and leaner rearview assembly 10 than can otherwise be provided with traditional assemblies. As shown in FIGS. 1 and 5, the brace 20 includes a generally trapezoidal configuration, with the spring clip 22 attached to a top corner of the brace 20. It will be understood by one having ordinary skill in the art that the brace 20 may take on different constructions and shapes. In addition, the brace 20 may extend across the majority of the rearview assembly 10, such that the brace 20 generally conceals or protects a rear side of the carrier plate 50. It will also be understood that the brace 20 and associated components may be formed from a wide variety of materials, including plastics and metals.

Figure 6:
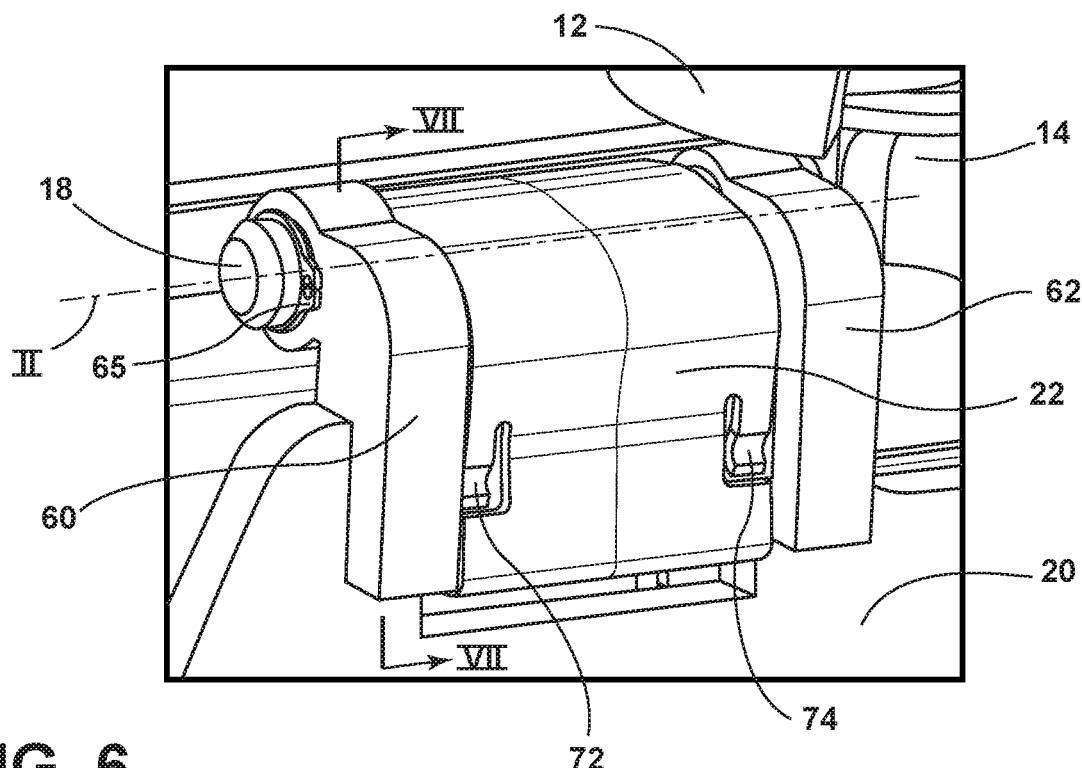
FIG. 6 is a top perspective view of a spring clip of a rearview assembly of the present disclosure.
Figure 7:
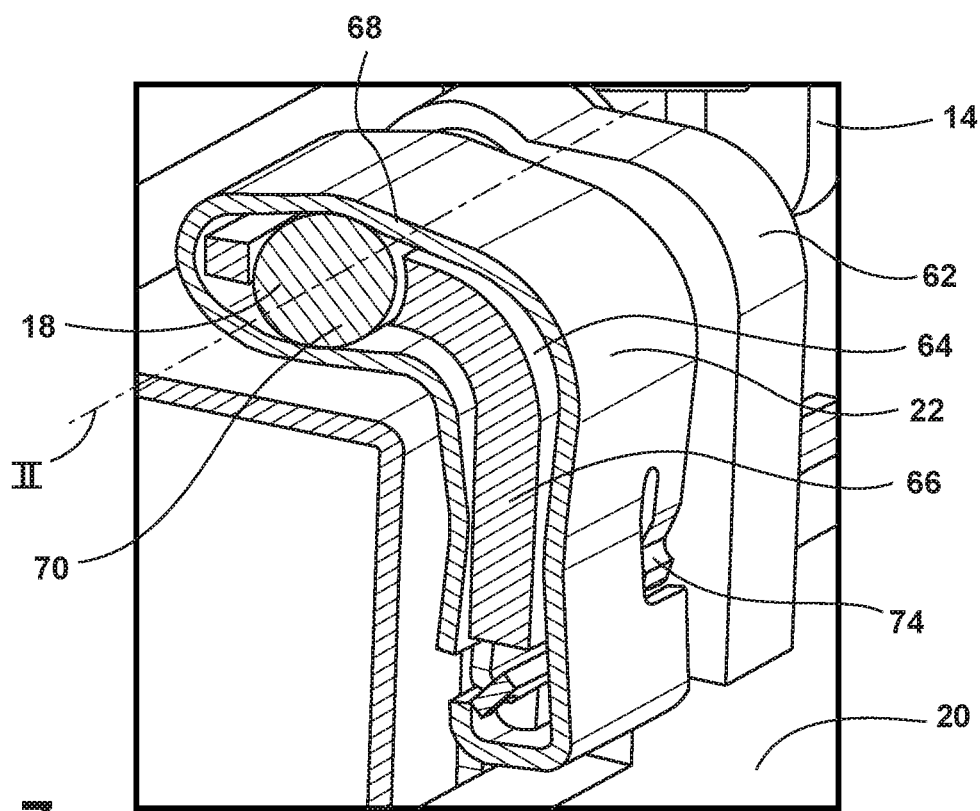
FIG. 7 is a side perspective cross-sectional view of the spring clip of FIG. 6.
Figure 8:
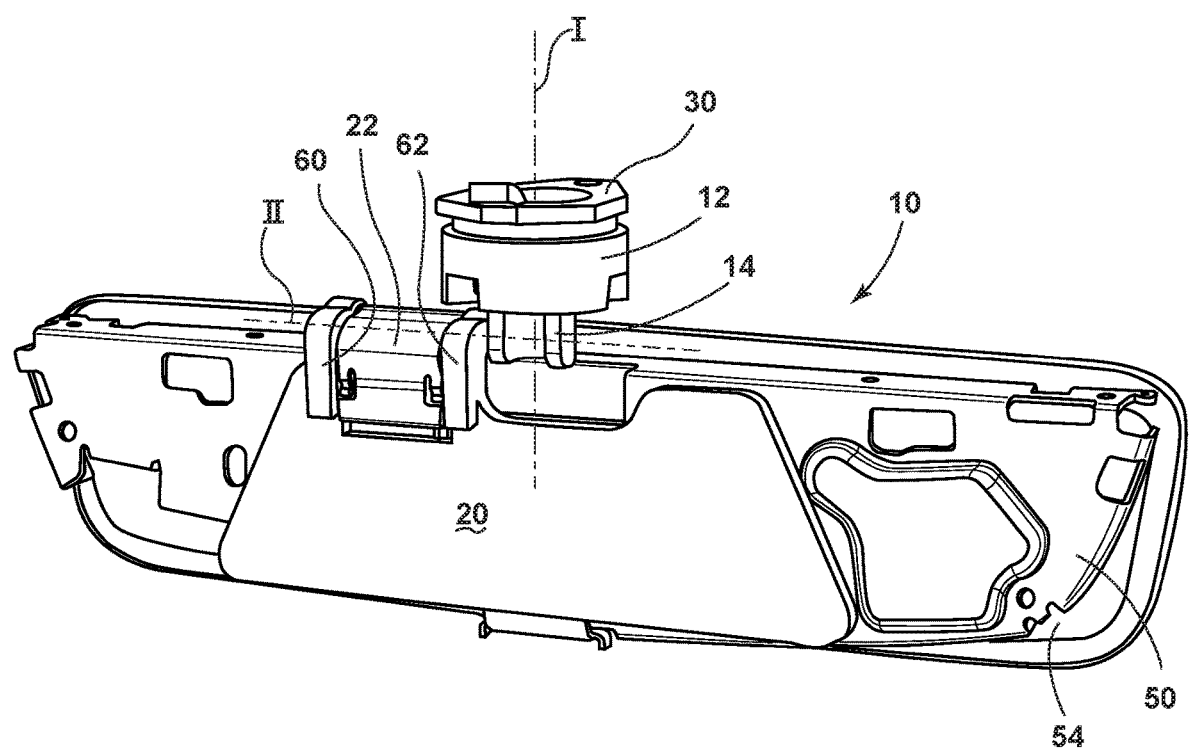
FIG. 8 is a rear perspective view of a rearview assembly of the present disclosure.

With reference now to FIGS. 6-8, the spring clip 22 is disposed between first and second connecting members 60, 62 extending from a top portion of the brace 20, and which operably couple the brace 20 with the second support 18. The first and second connecting members 60, 62 may be integral with the brace 20 or attached to the brace 20 by mechanical fasteners. The second support 18 is held in place by a retainer ring 65. The first and second connecting members 60, 62 are generally thicker than the spring clip 22 and the brace 20 and help maintain the spring clip 22 in position. The spring clip 22 includes a generally "L-shaped" construction defining an open interior 64 within which a connecting structure 66 extends. The connecting structure 66 also includes a generally "L-shaped" construction. It will be understood that the spring clip 22 may include other constructions as well. The connecting structure 66 extends between the first and second connecting members 60, 62 and is integrally formed therewith. The spring clip 22 extends about the connecting structure 66. A clamping portion 68 of the spring clip 22 clamps onto a shaft portion 70 of the second support 18. The clamp force on the shaft portion 70 provides the desired adjustment torque control for vertical adjustment about the second axis of rotation (II) (a generally horizontal axis). In addition, system lash is eliminated or minimized as a result of the spring clip 22 securely clamping onto the shaft portion 70 of the second support 18. In addition, clamping fingers 72 frictionally engage a first side of the connecting structure 66. Similarly, clamping fingers 74 frictionally engage a second side of the connecting structure 66. The clamping fingers 72, 74 generally define engagement tabs that abut opposing sides of the spring clip 22. The spring clip 22 also includes inwardly turned lower flanges 76 that provide additional structural rigidity of the spring clip 22.

A double axis construction, as set forth above, can be used as a replacement for traditional pivot assemblies, which can be bulky and difficult to adjust. Accordingly, a robust rearview assembly with a sleek profile can be implemented that performs optimally and is aesthetically pleasing. In addition, the interface between the mount and bracket allows for easy installation and removal of the rearview assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who rearview this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly comprising:
    a mount configured to be operably coupled with a vehicle;
    a first support having a generally linear body and extending downward from the mount, the first support defining a first axis of rotation;
    a second support defining a second axis of rotation and extending from a side of the first support in a direction generally orthogonal to the first axis of rotation of the first support;
    a brace coupled with the second support and abutting a carrier plate, the brace and the carrier plate being concealed within a housing;
    a spring clip extending around and in abutting contact with the second support and exerting a clamping force on at least one of the carrier plate and the brace;

first and second connecting members configured to operably couple the brace with the second support and including apertures aligned with the second axis of rotation, wherein the spring clip is disposed between the first and second connecting members, wherein the housing is operably coupled with the second support and is rotatable about both the first axis of rotation and the second axis of rotation.

2. The rearview assembly of claim 1, wherein the spring clip includes a clamping portion disposed below the second support.

3. The rearview assembly of claim 2, wherein the clamping portion includes first and second engagement tabs disposed on opposing sides of the spring clip.

4. The rearview assembly of claim 1, wherein the spring clip includes a generally L-shaped configuration defining an open interior.

5. The rearview assembly of claim 4, further comprising:
an L-shaped connecting structure disposed within the L-shaped configuration.

6. The rearview assembly of claim 1, wherein the brace is operably coupled with the carrier plate which supports a full display device.

7. The rearview assembly of claim 1, wherein the brace is operably coupled with the carrier plate which supports an electro-optic device operable between a generally clear state and a generally darkened state.

8. A rearview assembly comprising:
a mount configured to be operably coupled with a vehicle;
a first support extending downward from the mount and defining a first axis of rotation;
a wave spring disposed within the mount and extending about the first axis of rotation;
a second support defining a second axis of rotation and extending orthogonal from the first support;
a brace coupled with the second support and disposed at least partially within a housing, the brace being proximate a carrier plate operably coupled with an electro-optic device; and
a spring clip disposed at least partially within the housing, the spring clip extending around and in abutting contact with at least one of the brace and the carrier plate, wherein
the housing is operably coupled with the second support and conceals the carrier plate, the housing being rotatable about both the first axis of rotation and the second axis of rotation.

9. The rearview assembly of claim 8, wherein the spring clip includes a generally L-shaped configuration defining an open interior.

10. The rearview assembly of claim 9, further comprising:
an L-shaped connecting structure disposed within the L-shaped configuration.

11. The rearview assembly of claim 8, wherein the brace is operably coupled with the carrier plate which supports a full display device.

12. The rearview assembly of claim 8, wherein the mount is coupled with a bracket that includes channels configured to receive channels of the mount.

13. A rearview assembly comprising:
a mount operably coupled with a housing;
a first support extending downward from the mount and defining a first axis of rotation;
a second support defining a second axis of rotation that extends orthogonal to the first axis of rotation;
a brace coupled with the second support proximate a carrier plate operably coupled with an electro-optic device, the brace and the carrier plate disposed within the housing; and
a spring clip including an upper clamp portion proximate a top of the housing and that provides a clamping force around the second support and a lower clamp portion with clamping fingers within the housing that frictionally engage at least one of the brace and the carrier plate.

14. The rearview assembly of claim 13, wherein the spring clip is disposed between first and second connecting members.

15. The rearview assembly of claim 14, wherein the first and second connecting members operably couple the brace with the second support.

16. The rearview assembly of claim 13, wherein the brace is operably coupled with the carrier plate which supports a full display device.

17. The rearview assembly of claim 13, wherein the brace is operably coupled with the carrier plate which supports the electro-optic device operable between a generally clear state and a generally darkened state.

18. The rearview assembly of claim 13, wherein the mount is coupled with a bracket that includes channels configured to receive channels of the mount.

* * * * *